(12) United States Patent
Chen et al.

(10) Patent No.: US 8,827,681 B2
(45) Date of Patent: Sep. 9, 2014

(54) AUTOMATIC POWDER RECYCLING APPARATUS

(75) Inventors: Chih-Kai Chen, Hsinchu (TW);
Ke-Ming Huang, Hsinchu (TW);
Kwo-Yuan Shi, Hsinchu (TW)

(73) Assignee: Microjet Technology Co., Ltd, Hsinchu (TW)

( * ) Notice: Subject to any disclaimer, the term of this patent is extended or adjusted under 35 U.S.C. 154(b) by 466 days.

(21) Appl. No.: 13/219,413

(22) Filed: Aug. 26, 2011

(65) Prior Publication Data

US 2012/0052145 A1  Mar. 1, 2012

(30) Foreign Application Priority Data

Aug. 31, 2010  (CN) .......................... 2010 1 0276144

(51) Int. Cl.
| | | |
|---|---|---|
| B29C 31/04 | (2006.01) | |
| B08B 15/02 | (2006.01) | |
| B08B 5/02 | (2006.01) | |

(52) U.S. Cl.
CPC ................. B08B 5/02 (2013.01); B08B 15/026 (2013.01)
USPC ............ 425/215; 425/218; 264/113; 264/308

(58) Field of Classification Search
CPC  B29C 43/20; B29C 67/0081; B29C 67/0092; B29C 67/0074; B29C 67/0077
USPC ................... 425/215, 217, 218; 264/113, 308
See application file for complete search history.

(56) References Cited

U.S. PATENT DOCUMENTS

| | | | | |
|---|---|---|---|---|
| 4,654,171 | A * | 3/1987 | Boncoeur et al. .......... | 425/405.1 |
| 7,435,368 | B2 * | 10/2008 | Davidson et al. ............. | 425/218 |
| 2002/0090410 | A1 * | 7/2002 | Tochimoto et al. ........... | 425/215 |
| 2004/0084814 | A1 * | 5/2004 | Boyd et al. ..................... | 425/216 |
| 2010/0247703 | A1 * | 9/2010 | Shi et al. ...................... | 425/375 |

FOREIGN PATENT DOCUMENTS

| | | |
|---|---|---|
| CN | 2370976 Y | 3/2000 |
| CN | 2374286 Y | 4/2000 |
| CN | 2614849 Y | 11/2000 |
| JP | 2002248691 | 9/2002 |
| TW | 410684 | 11/2000 |
| TW | 479569 | 3/2002 |
| TW | 576259 | 2/2004 |
| WO | 2010083997 | 7/2010 |

\* cited by examiner

*Primary Examiner* — Joseph S Del Sole
*Assistant Examiner* — Thukhanh Nguyen (57) ABSTRACT

An automatic powder recycling apparatus includes a housing, a plurality of isolation elements, an air-blowing device, a powder filtering member, a recycling member and an air-inhaling device. A sealed space is defined within the housing. The air-blowing device is disposed within the sealed space for removing the powder attached on the surface of the finished product. The air-inhaling device is in communication with the first receptacle for allowing the first receptacle to be in a negative pressure state. When the powder on the finished product is removed by the air-blowing device and directed to the powder filtering member by the air-inhaling device, the powder is filtered and blocked by the powder filtering member. When the air-inhaling device is disabled, the powder blocked by the powder filtering member naturally falls down to the recycling member.

5 Claims, 7 Drawing Sheets

AUTOMATIC POWDER RECYCLING APPARATUS

FIELD OF THE INVENTION

The present invention relates to an automatic powder recycling apparatus, and more particularly to an automatic powder recycling apparatus for use in a three-dimensional object-forming system.

BACKGROUND OF THE INVENTION

The rapid prototyping (RP) technology is developed from the idea of forming a pyramid by stacking layers, and the main technical feature is to achieve fast formation. A complicated design can be transformed into a three-dimensional physical model automatically fast without any cutting tools, moulds and fixtures. Thus, the development cycle of new products and research and development cost are largely reduced to ensure time to market for new products and first-time-right ratio. Accordingly, a complete and convenient product design tool is provided between technicians and non-technicians (e.g. managers and users), and the product competitiveness and the quick reaction capability of enterprises in the market are improved obviously.

Recently, rapid prototyping technology develops a method for producing three-dimensional physical models by combining jet printing and precise positioning of carriers. The producing method begins by first spreading a layer of powder on the carrier and then printing high viscosity liquid binder on part of the powder by using jet printing technology, so that the liquid binder and the powder stick together to become solidified. After the above steps are repeatedly done, a three-dimensional physical model is produced by stacking multiple layers.

During the processes of spreading powder, printing and taking out the finished product by the conventional rapid prototyping technology, the flying dust usually pollutes the working environment and contaminates the whole three-dimensional object-forming machine. For maintaining normal operation, a dust-collecting and cleaning task is frequently done after a specified stage of the rapid prototyping technology.

Moreover, the light source is usually disposed outside the three-dimensional object-forming machine. The light source is only configured for emitting light to illuminate the three-dimensional object-forming machine from outside to inside.

Therefore, there is a need of providing an automatic powder recycling apparatus so as to obviate the drawbacks encountered from the prior art.

SUMMARY OF THE INVENTION

The present invention provides an automatic powder recycling apparatus for avoiding the problem of polluting the working environment during the processes of spreading powder, printing and taking out the finished product. As previously, the light source of the conventional three-dimensional object-forming machine is disposed outside the machine and only configured to illuminate from outside to inside. The automatic powder recycling apparatus of the present invention can expand the function of the light source.

In accordance with an aspect of the present invention, there is provided an automatic powder recycling apparatus for use in a three-dimensional object-forming system to attract and filter powder attached on a surface of a finished product. The automatic powder recycling apparatus includes a housing, a plurality of isolation elements, an air-blowing device, a powder filtering member, a recycling member and an air-inhaling device. The isolation elements are connected with the housing. Through the isolation elements, a sealed space is defined within the housing. The air-blowing device is disposed within the sealed space for removing the powder attached on the surface of the finished product. The powder filtering member is disposed within the housing for dividing the sealed space into a first receptacle and a second receptacle. The finished product and the air-blowing device are accommodated within the second receptacle. The recycling member is accommodated within the second receptacle. The air-inhaling device is in communication with the first receptacle for allowing the first receptacle to be in a negative pressure state. When the powder on the finished product is removed by the air-blowing device and directed to the powder filtering member by the air-inhaling device, the powder is filtered and blocked by the powder filtering member. When the air-inhaling device is disabled, the powder blocked by the powder filtering member naturally falls down to the recycling member.

In accordance with another aspect of the present invention, there is provided an automatic powder recycling apparatus for use in a three-dimensional object-forming system to attract and filter powder attached on a surface of a finished product. The automatic powder recycling apparatus includes a housing, a plurality of isolation elements, an air-blowing device, a powder filtering member, a recycling member and an air-inhaling device. The isolation elements are connected with the housing. Through the isolation elements, a sealed space is defined within the housing. The air-blowing device is disposed within the sealed space for removing the powder attached on the surface of the finished product. The powder filtering member is disposed within the housing for dividing the sealed space into a first receptacle and a second receptacle. The finished product and the air-blowing device are accommodated within the second receptacle. The recycling member is accommodated within the second receptacle, and includes a screen mesh, a connecting pipe, a transmission mechanism and a recycling tank. The screen mesh is driven by the transmission mechanism to be swung. The air-inhaling device is in communication with the first receptacle for allowing the first receptacle to be in a negative pressure state. When the powder on the finished product is removed by the air-blowing device and directed to the powder filtering member by the air-inhaling device, the powder is filtered and blocked by the powder filtering member. When the air-inhaling device is disabled, the powder blocked by the powder filtering member naturally falls down to the screen mesh. The powder passing through the screen mesh is transferred to the recycling tank through the connecting pipe.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
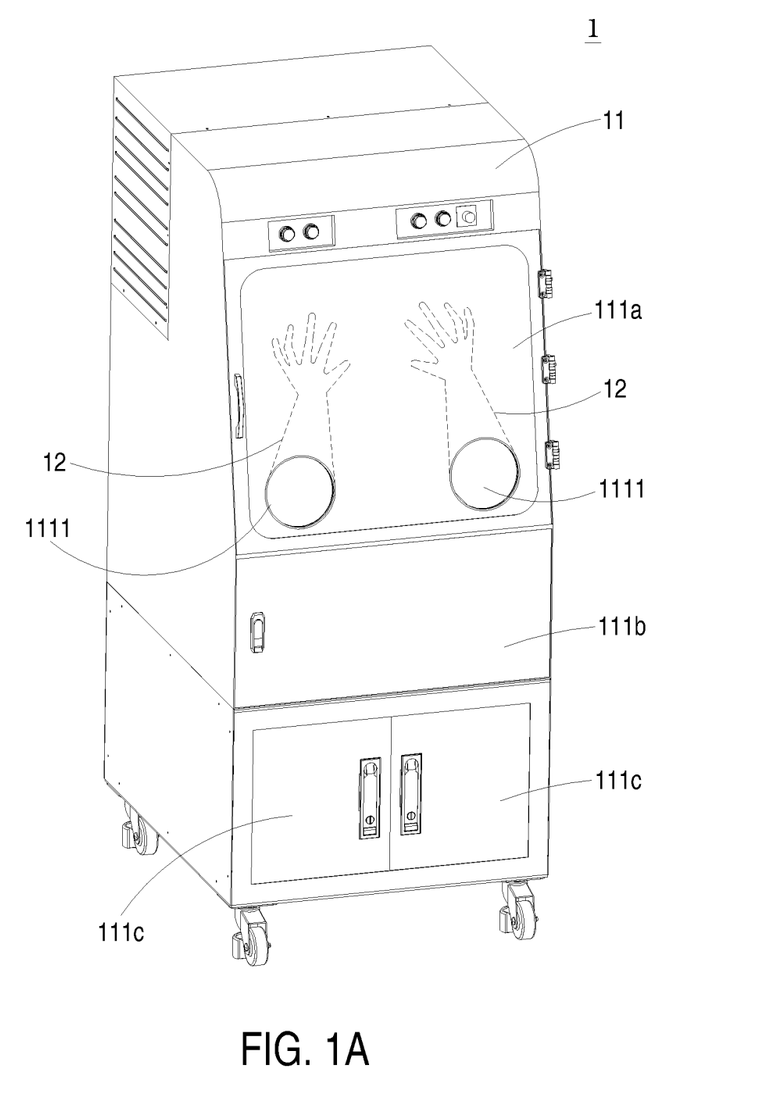
FIG. 1A is a schematic perspective view illustrating an automatic powder recycling apparatus according to an embodiment of the present invention.
Figure 1B:
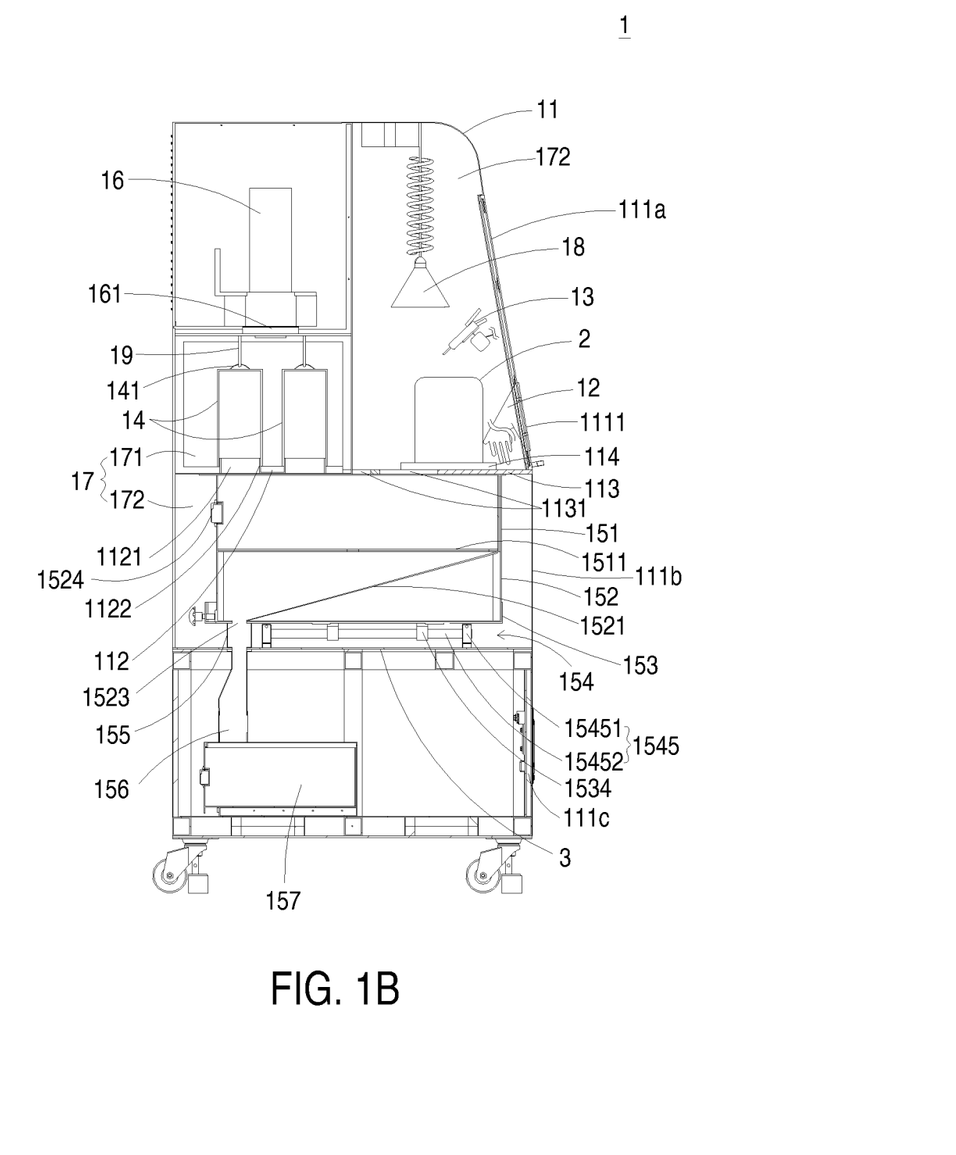
FIG. 1B is a schematic side view illustrating an automatic powder recycling apparatus of FIG. 1A.

FIG. 1A is a schematic perspective view illustrating an automatic powder recycling apparatus according to an embodiment of the present invention. FIG. 1B is a schematic side view illustrating an automatic powder recycling apparatus of FIG. 1A. The automatic powder recycling apparatus 1 is applied to a three-dimensional object-forming system (not shown). The three-dimensional object-forming system has a three-dimensional object-forming mechanism (not shown) such as a floor three-dimensional object-forming mechanism for producing a three-dimensional physical model. The three-dimensional object-forming mechanism is disclosed in for example Chinese Patent No. CN 200910130570.1, entitled "Three-dimensional object-forming mechanism and method" and filed on Mar. 31, 2009. The inner components of the three-dimensional object-forming mechanism comprises for example a construction stage, a printing module, a plurality of temporary storage tanks, a plurality of powder supplying tanks, a construction tank, a printing quality inspection device, an image detection element, a maintenance device, a dust-proof device, an air circulating and heating device and a continuous liquid supply device.

The finished product (i.e. the three-dimensional physical model) of the three-dimensional object-forming mechanism is then transferred to the inner portion of the automatic powder recycling apparatus 1. By the automatic powder recycling apparatus 1, the powder attached on the surface of the finished product is attracted and filtered, and thus the powder can be further sieved and recycled.

Please refer to FIGS. 1A and 1B again. The automatic powder recycling apparatus 1 of the present invention at least comprises a housing 11, a plurality of isolation elements 12, an air-blowing device 13, a powder filtering member 14, a recycling member 15 (see FIG. 2A), an air-inhaling device 16 and a light-emitting element 18. The housing 11 has a front door plate 111a. When the front door plate 111a is opened, a finished product 2 can be placed within the housing 11. In addition, the front door plate 111a has a plurality of openings 1111. Each opening 1111 is connected with a corresponding isolation element 12 (e.g. a working glove). Consequently, a sealed space 17 is defined within the housing 11 and isolated from the surroundings.

In this embodiment, the air-blowing device 13 is an air spray gun. The air spray gun is disposed within the sealed space 17 for removing the powder attached on the surface of the finished product 2.

Please refer to FIG. 1B again. A partition plate 112 and a support plate 113 are disposed within the housing 11. The partition plate 112 has at least a perforation 1121, which is in communication with the top side and bottom side of the partition plate 112. A ring-shaped structure 1122 is protruded from a top surface of the partition plate 112 and sheathed around a periphery of the perforation 1121. In addition, the finished product 2 is placed on a construction platform 114. The finished product 2 and the construction platform 114 are supported on the support plate 113. Similarly, the support plate 113 has at least a perforation 1131 which is in communication with the top side and bottom side of the support plate 113. Through the perforation 1131, the powder separated off the finished product 2 can be recycled to the recycling member 15.

An example of the powder filtering member 14 includes but is not limited to a dust collection bag. The lower part of the powder filtering member 14 is aligned with the perforation 1121 and sheathed around the ring-shaped structure 1122. In addition, a seal element (not shown) is detachably sheathed around the powder filtering member 14 and the ring-shaped structure 1122, thereby sealing the perforation 1121. Consequently, via the powder filtering member 14, the sealed space 17 within the housing 11 is divided into a first receptacle 171 and a second receptacle 172. For example, the seal element is a tension strap. The finished product 2, the air-blowing device 13 and the recycling member 15 are accommodated within the second receptacle 172. In an embodiment, the powder filtering member 14 is made of non-woven fabric material. The powder filtering member 14 has a drum-like structure and extended toward the first receptacle 171. It is noted that the powder filtering member 14 may be made of other material and the shape thereof may be varied.

For optimizing the filtering effect of the powder filtering member 14, a connecting structure 141 is located at the upper part of the powder filtering member 14. In this embodiment, the connecting structure 141 is a hollow annular structure. The connecting structure 141 is detachably connected with a supporting structure 19 within the first receptacle 171. Since the powder filtering member 14 is connected with the supporting structure 19 through the connecting structure 141, the powder filtering member 14 is upwardly propped open to achieve a good filtering effect. In an embodiment, an end of the supporting structure 19 is a hooking structure fixed on an inner and top surface of the housing 11.

An example of the air-inhaling device 16 is a blower. The air-inhaling device 16 has an air inlet 161 and an air outlet (not shown). The air inlet 161 is in communication with the first receptacle 171. During operation of the air-inhaling device 16, the air is inhaled through the air inlet 161 and exhausted from the air-inhaling device 16, so that the first receptacle 171 has a negative pressure. During the finished product 2 is cleaned by the air-blowing device 13, the powder attached on the finished product 2 may fall down to the recycling member 15 through the perforation 1131 of the support plate 113. As the powder is collided by some structures, the powder may ascend to the powder filtering member 14. The powder will be blocked by the powder filtering member 14 from entering the air-inhaling device 16. In such way, the use life of the air-inhaling device 16 is not impaired. Moreover, when the air-inhaling device 16 is turned off or disabled, the powder blocked by the powder filtering member 14 may naturally fall down to the recycling member 15. Consequently, a dust-proof purpose and a powder-recycling purpose will be achieved.

Since the seal element is detachably sheathed around the powder filtering member 14 and the ring-shaped structure 1122, the powder filtering member 14 can be quickly assembled or disassembled. For periodically disassembling and cleaning the powder filtering member 14, the user may detach the connecting structure 141 from the supporting structure 19 and detach the seal element from the powder filtering member 14. After the powder filtering member 14 is removed, the powder accumulated within the powder filtering member 14 can be cleaned. Consequently, the normal filtering efficacy of the powder filtering member 14 of the automatic powder recycling apparatus 1 can be maintained.

In FIG. 1B, two powder filtering members 14 are shown. It is noted that the number of the powder filtering member 14 is not restricted. According to the practical requirements, the automatic powder recycling apparatus 1 may contain one powder filtering member 14 or more than two powder filtering members 14.

Please refer to FIG. 1B again. A light-emitting element 18 is further disposed within the housing 11 of the automatic powder recycling apparatus 1. The light-emitting element 18 is accommodated within the second receptacle 172 of the sealed space 17. In addition, the light-emitting element 18 may be elastically stretched or compressed in the vertical direction. In addition to the function of serving as a light source within the housing, the light-emitting element 18 may facilitate heating and drying the finished product 2. Consequently, the finished product 2 can be quickly solidified.

Figure 2A:
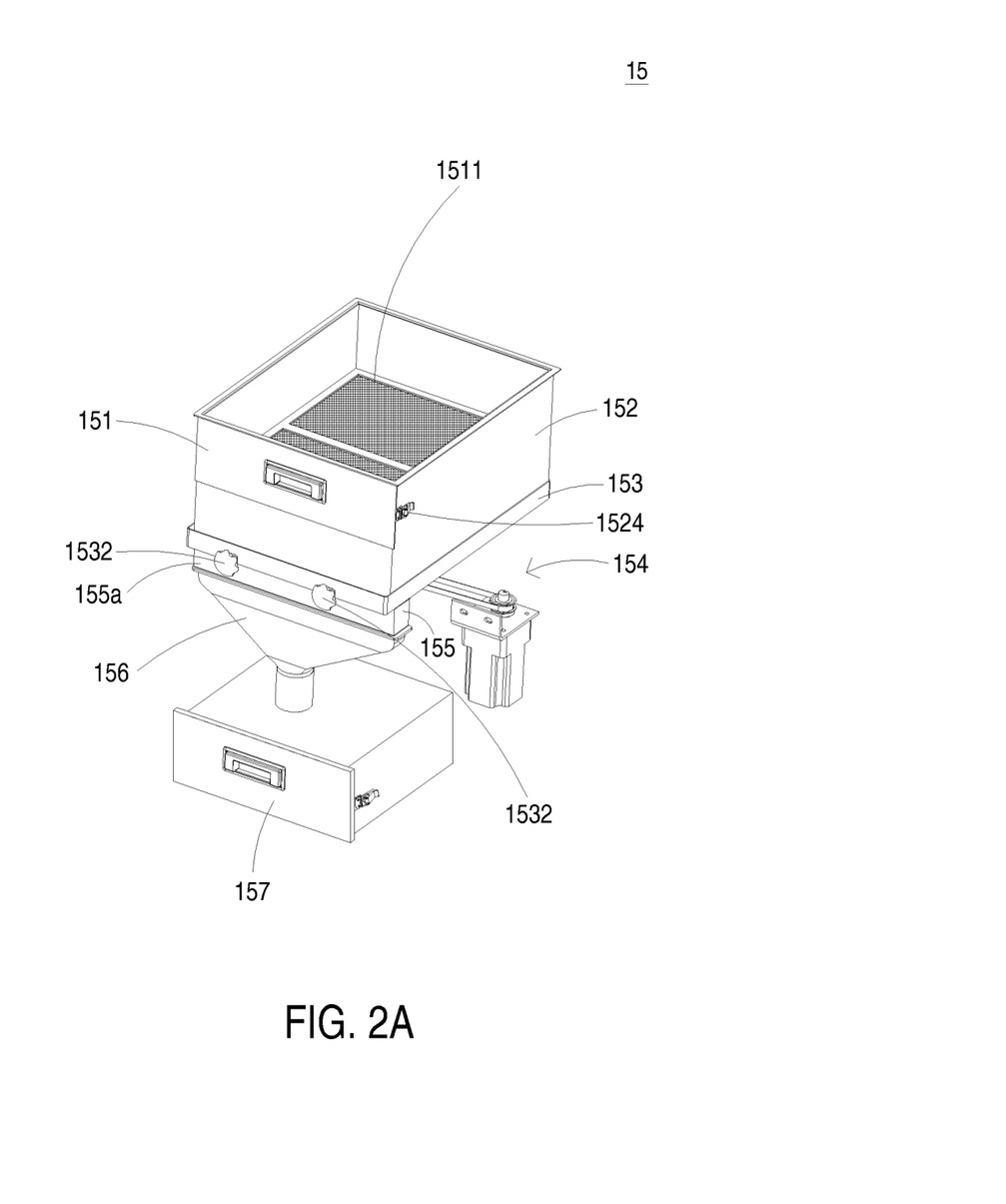
FIG. 2A is a schematic perspective view illustrating the recycling member of the automatic powder recycling apparatus of the present invention.
Figure 2B:
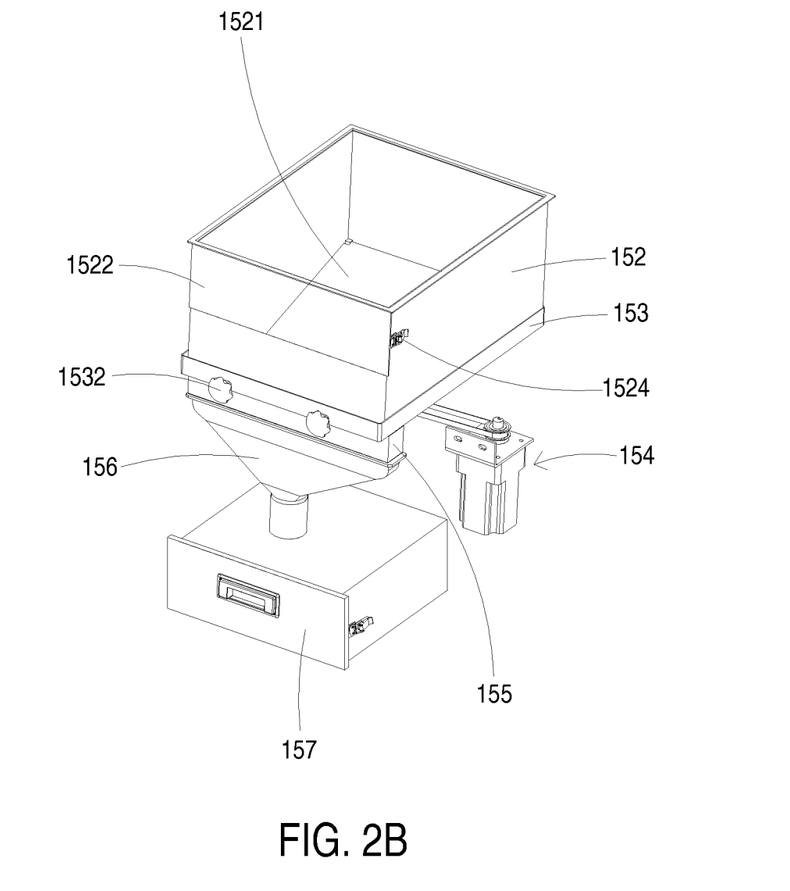
FIG. 2B is a schematic perspective view illustrating the recycling member of FIG. 2A, in which the powder sieving box is not shown.
Figure 2C:
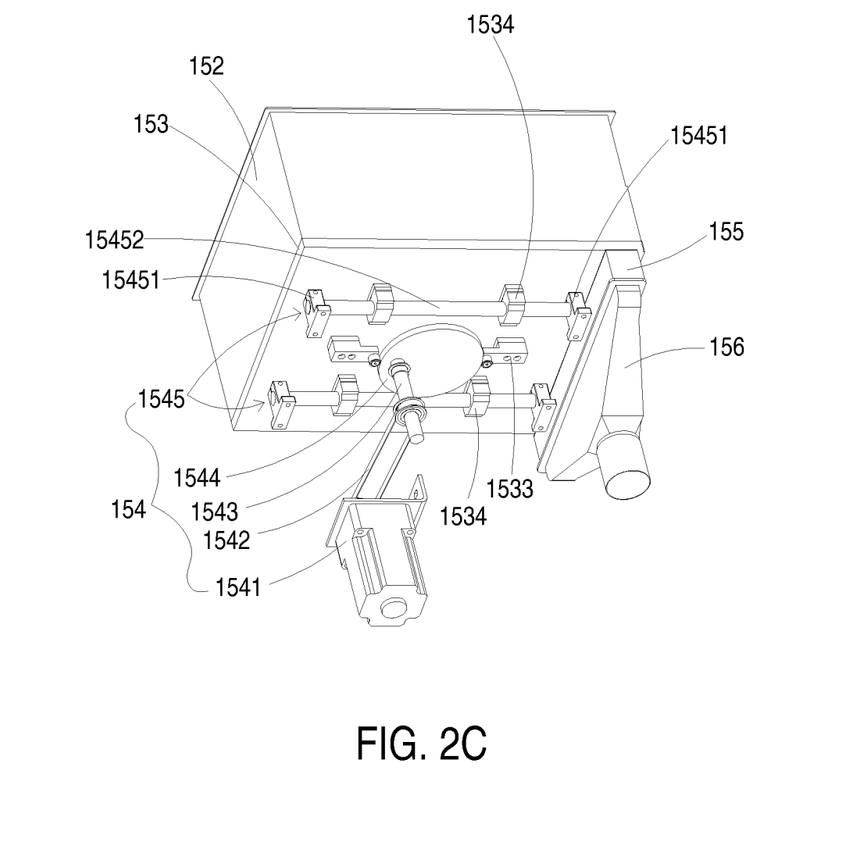
FIG. 2C is a schematic perspective view illustrating the backside of the recycling member of FIG. 2A.

Please refer to FIG. 1B and FIG. 2A. FIG. 2A is a schematic perspective view illustrating the recycling member of the automatic powder recycling apparatus of the present invention. The recycling member 15 comprises a powder sieving box 151, a powder sieving frame 152, a linking seat 153, a transmission mechanism 154, a connecting tank 155, a connecting pipe 156 and a recycling tank 157. The linking seat 153 is used for supporting the powder sieving box 151 and the powder sieving frame 152. In addition, the linking seat 153 is connected with the transmission mechanism 154. In response to movement of the transmission mechanism 154, the linking seat 153 is swung toward the right and left sides in a reciprocating manner (see also FIGS. 2B and 2C). Correspondingly, the powder sieving box 151 and the powder sieving frame 152 are swung toward the right and left sides in a reciprocating manner.

Please refer to FIG. 2A again. A screen mesh 1511 is located at the bottom side of the powder sieving box 151. The powder sieving frame 152 has a slant surface 1521 and two slots 1522 and 1523 (see FIG. 2B and FIG. 1B). Through the slot 1522 at the front side of the powder sieving frame 152, the powder sieving box 151 is selectively accommodated within the powder sieving frame 152 or withdrawn from the powder sieving frame 152. By means of a locking element 1524, the powder sieving box 151 can be locked and positioned onto the powder sieving frame 152. During the finished product 2 is cleaned by the air-blowing device 13, the powder attached on the finished product 2 may fall down. If the powder is not blocked by the powder filtering member 14, the powder may fall down to the screen mesh 1511. As the linking seat 153, the powder sieving box 151 and the powder sieving frame 152 are swung toward the right and left sides by the transmission mechanism 154, the powder is sieved by the screen mesh 1511 to filter off the large-sized powder or dust. The powder passing through the screen mesh 1511 falls down to the slant surface 1521. The powder is guided by the slant surface 1521 and transferred to the slot 1523, which is located at the bottom side of the powder sieving frame 152.

Please refer to FIGS. 2A, 2B, 2C and 2D. The connecting tank 155 is in communication with the connecting pipe 156 and the linking seat 153. The powder passing through the screen mesh 1511 is transferred to the recycling tank 157 through the slot 1523 of the powder sieving frame 152, a hollow portion 1531 of the linking seat 153, the connecting tank 155 and the connecting pipe 156. After the powder is transferred to the recycling tank 157, the powder can be reused.

Figure 2D:
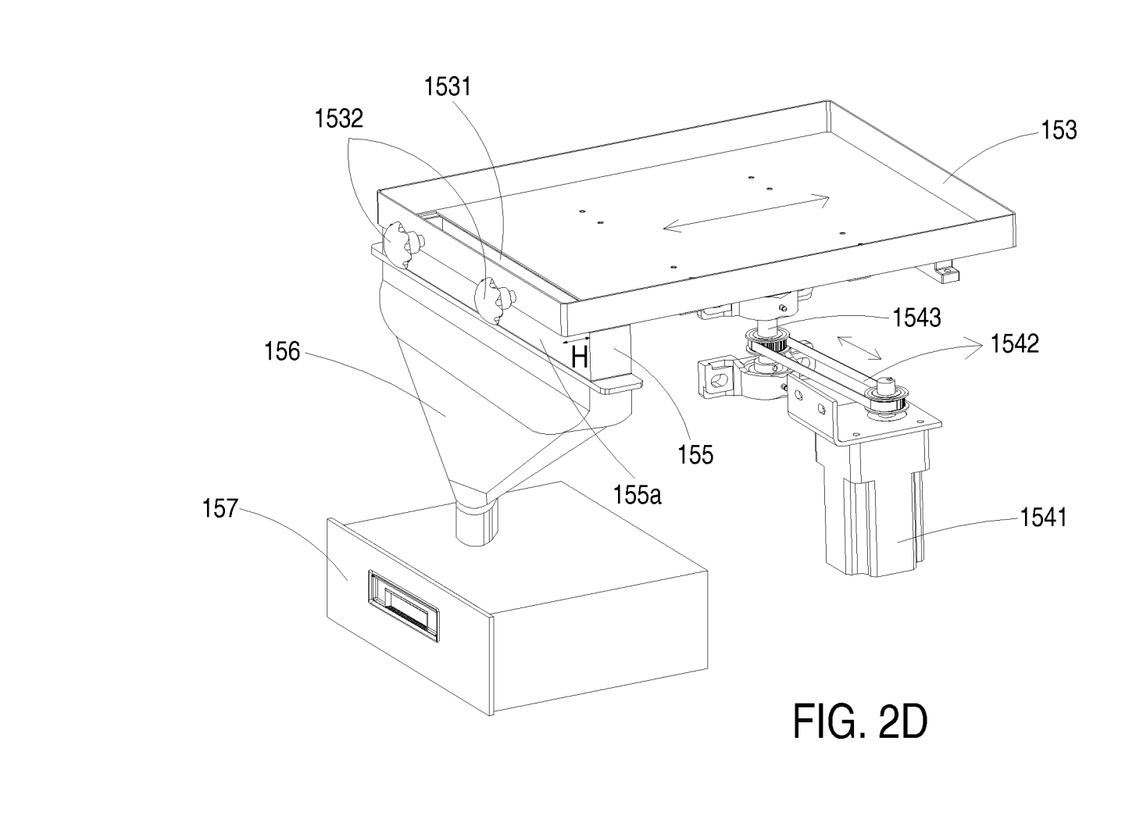
FIG. 2D is a schematic perspective view illustrating the recycling member of FIG. 2B, in which the powder sieving frame is not shown.
Figure 2E:
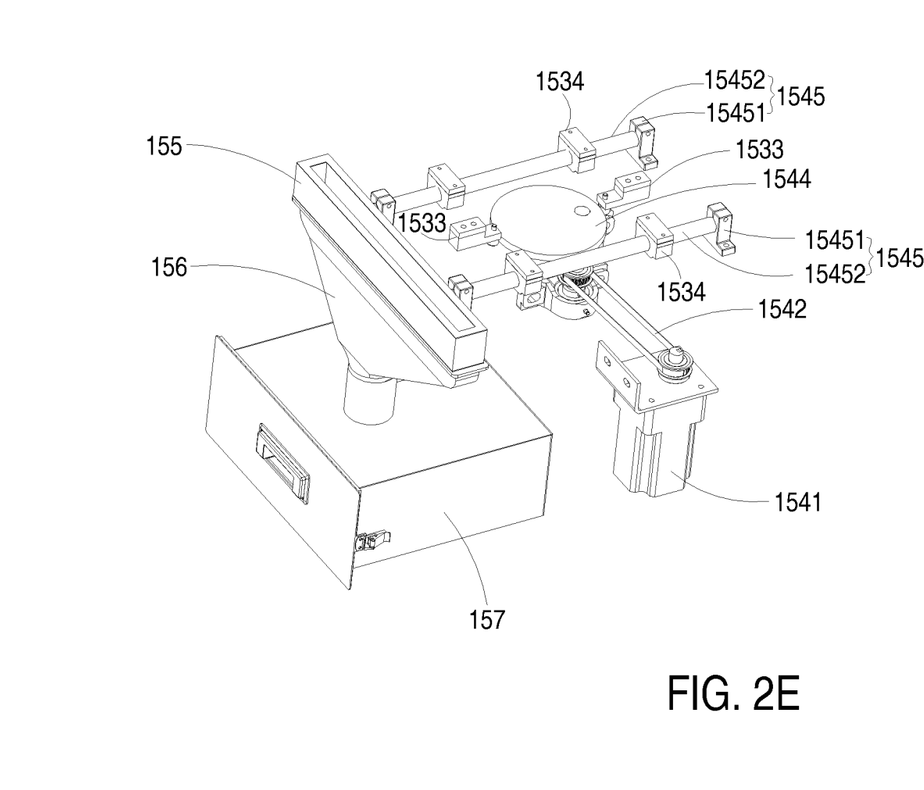
FIG. 2E is a schematic perspective view illustrating the recycling member of FIG. 2D, in which the linking seat is not shown.

Please refer to FIGS. 2A and 2D. The linking seat 153 further comprises at least one stopper 1532. In this embodiment, the linking seat 153 comprises two stoppers 1532. It is noted that the number of the stoppers 1532 may be varied. By means of the stoppers 1532, the movable distance of swinging the linking seat 153 is confined. When the linking seat 153 is moved in a direction toward the transmission mechanism 154, if a sidewall 155a of the connecting tank 155 is contacted with the stopper 1532, the stopper 1532 is sustained against the sidewall 155a of the connecting tank 155. Consequently, the linking seat 153 fails to be continuously moved forwardly. Under this circumstance, the slot 1531 of the linking seat 153 is in communication with the connecting tank 155 for facilitating dropping the powder to the connecting pipe 156. Until the linking seat 153 is driven to be reversely moved by the transmission mechanism 154, the linking seat 153 is moved in the direction distant from the transmission mechanism 154 and thus the stopper 1532 is distant from the sidewall 155a of the connecting tank 155. In such way, the movable distance of swinging the linking seat 153 is confined by the stopper 1532. As shown in FIG. 2D, the movable distance of swinging the linking seat 153 is H.

Please refer to FIG. 1B and FIGS. 2A, 2C and 2E. The transmission mechanism 154 at least comprises a driving motor 1541, a transmission belt 1542, a rotating shaft 1543 and an eccentric wheel 1544. Through the transmission belt 1542 and the rotating shaft 1543, the motive power provided by the driving motor 1541 is transmitted to the eccentric wheel 1544 to rotate the eccentric wheel 1544. The eccentric wheel 1544 is sustained against two first connecting parts 1533, which are connected with a bottom part of the linking seat 153. As the eccentric wheel 1544 is rotated and sustained against the first connecting parts 1533, the linking seat 153 is swung toward the right and left sides in a reciprocating manner. Moreover, the transmission mechanism 154 further comprises a plurality of connecting assemblies 1545. The connecting assemblies 1545 are located at bilateral sides of the eccentric wheel 1544. Each connecting assembly 1545 comprises a plurality of connecting parts 15451 and a rod 15452. The connecting parts 15451 are arranged at both ends of the rod 15452, and coupled with a slab 3 that is disposed within the automatic powder recycling apparatus 1 (see FIG. 1B). Moreover, a plurality of second connecting parts 1534 are connected with the bottom part of the linking seat 153. The second connecting parts 1534 are movably sheathed around corresponding rods 15452, so that the linking seat 153 can be swung more smoothly.

Please refer to FIG. 1B again. The housing 11 has two front door plates 111b and 111c, which can be selectively opened or closed. When the front door plate 111b is opened, the powder sieving box 151 may be withdrawn from the powder sieving frame 152. Consequently, the large-sized powder and dust retained on the screen mesh 1511 may be removed. When the front door plate 111c is opened, the recycled powder contained in the recycling tank 157 may be taken out.

A process of using the automatic powder recycling apparatus 1 to recycle the powder will be illustrated in more details as follows. Firstly, the finished product 2 is cleaned by the air-blowing device 13, and thus a great portion of the powder attached on the finished product 2 may fall down to the recycling member 15 through the perforation 1131 of the support plate 113. The remaindering small portion of the powder is introduced into the powder filtering member 14 by the air-inhaling device 16. When the air-inhaling device 16 is turned off or disabled, the powder blocked by the powder filtering member 14 may naturally fall down to the recycling member 15. After the powder is sieved by the recycling member 15, the powder can be directly recycled and reused. Consequently, a dust-proof purpose and a powder-recycling purpose will be achieved.

Moreover, since the automatic powder recycling apparatus 1 of the present invention has the sealed space within the housing, the powder and the dust are prevented from flying everywhere outside the housing. During operation of the automatic powder recycling apparatus 1, the air quality of the working environment is enhanced.

From the above description, the automatic powder recycling apparatus of the present invention has many benefits. For example, the powder attached on the finished product is removed by the air-flowing device within the sealed space of the housing. In addition, the internal portion of the housing is divided into a first receptacle and a second receptacle by the powder filtering member. Since the air-inhaling device is separated from the powder by the powder filtering member, the use life of the air-inhaling device is not impaired. During operation of the air-inhaling device, the first receptacle is in a negative pressure state. Consequently, after the powder attached on the finished product is removed by the air-flowing device, the flying powder will be introduced into and filtered by the powder filtering member by the air-inhaling device. When said air-inhaling device is disabled, the powder blocked by the powder filtering member naturally falls down to the recycling member. After the powder is sieved by the recycling member, the powder can be directly recycled and reused. That is, during operation of the automatic powder recycling apparatus of the present invention, the powder and the dust are prevented from flying everywhere outside the housing, and thus the air quality of the working environment is enhanced. Moreover, the automatic powder recycling apparatus is capable of recycling the powder. In addition, the light-emitting element is disposed within the housing. In addition to the function of serving as a light source within the housing, the light-emitting element can facilitate heating and drying the finished product, so that the finished product can be quickly solidified.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An automatic powder recycling apparatus for use in a three-dimensional object-forming system to attract and filter powder attached on a surface of a finished product, said automatic powder recycling apparatus comprising:
    a housing;
    a plurality of isolation elements connected with said housing, wherein a sealed space is defined within said housing through said isolation elements;
    an air-blowing device disposed within said sealed space for removing said powder attached on said surface of said finished product;
    a powder filtering member disposed within said housing for dividing said sealed space into a first receptacle and a second receptacle, wherein said finished product and said air-blowing device are accommodated within said second receptacle;
    a recycling member accommodated within said second receptacle, and comprising a screen mesh, a connecting pipe, a transmission mechanism and a recycling tank, wherein said screen mesh is driven by said transmission mechanism to be swung; and
    an air-inhaling device in communication with said first receptacle for allowing said first receptacle to be in a negative pressure state, wherein when said powder on said finished product is removed by said air-blowing device and directed to said powder filtering member by said air-inhaling device, said powder is filtered and blocked by said powder filtering member, wherein when said air-inhaling device is disabled, said powder blocked by said powder filtering member naturally falls down to said screen mesh, wherein said powder passing through said screen mesh is transferred to said recycling tank through said connecting pipe.

2. The automatic powder recycling apparatus according to claim 1 wherein said recycling member further comprises a powder sieving box and a powder sieving frame, wherein said screen mesh is located at a bottom side of said powder sieving box, and said powder sieving box is selectively accommodated within said powder sieving frame or withdrawn from said powder sieving frame, wherein said powder sieving frame has a slant surface and a slot, and said powder passing through said screen mesh is guided to said slot by said slant surface.

3. The automatic powder recycling apparatus according to claim 2 wherein said recycling member further comprises:
    a linking seat for supporting said powder sieving box and said powder sieving frame and connecting with said transmission mechanism, wherein said linking seat is driven by said transmission mechanism to be swung toward left and right side in a reciprocating manner, thereby swinging said screen mesh; and
    a connecting tank in communication with said connecting pipe and said linking seat, wherein said powder passing through said screen mesh is transferred to said recycling tank through said slot of said powder sieving frame, a hollow portion of said linking seat, said connecting tank and said connecting pipe.

4. The automatic powder recycling apparatus according to claim 3 wherein said linking seat further comprises at least one stopper for confining a movable distance of swinging said linking seat.

5. The automatic powder recycling apparatus according to claim 3 wherein said transmission mechanism comprises a driving motor, a transmission belt, a rotating shaft and an eccentric wheel, wherein through said transmission belt and said rotating shaft, a motive power provided by said driving motor is transmitted to said eccentric wheel to rotate said eccentric wheel, wherein upon rotation of said linking seat, said linking seat is swung toward said left and right side in said reciprocating manner.

* * * * *